(12) United States Patent
Thomsen et al.

(10) Patent No.: US 12,049,867 B2
(45) Date of Patent: Jul. 30, 2024

(54) REDUCTION OF EDGEWISE VIBRATIONS USING TORSIONAL VIBRATION SIGNAL

(71) Applicant: VESTAS WIND SYSTEMS A/S, Aarhus N (DK)

(72) Inventors: Jesper Sandberg Thomsen, Hadsten (DK); Ian Couchman, Horley (GB); Morten Bro, Aalborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 124 days.

(21) Appl. No.: 17/615,064

(22) PCT Filed: May 26, 2020

(86) PCT No.: PCT/DK2020/050148
§ 371 (c)(1),
(2) Date: Nov. 29, 2021

(87) PCT Pub. No.: WO2020/239178
PCT Pub. Date: Dec. 3, 2020

(65) Prior Publication Data
US 2022/0220937 A1  Jul. 14, 2022

(30) Foreign Application Priority Data
May 28, 2019 (DK) .......................... PA 2019 70336

(51) Int. Cl.
*F03D 7/02* (2006.01)
(52) U.S. Cl.
CPC ......... *F03D 7/0224* (2013.01); *F03D 7/0296* (2013.01); *F05B 2270/327* (2013.01); *F05B 2270/334* (2013.01); *F05B 2270/807* (2013.01)
(58) Field of Classification Search
CPC .... F03D 7/0224; F03D 7/0296; F03D 7/0298; F05B 2270/334
See application file for complete search history.

(56) References Cited

U.S. PATENT DOCUMENTS

| | | | |
|---|---|---|---|
| 11,698,052 B2 * | 7/2023 | Fu | F03D 7/0288 416/31 |
| 2011/0229300 A1 * | 9/2011 | Kanev | F03D 7/043 415/33 |

(Continued)

FOREIGN PATENT DOCUMENTS

| | | |
|---|---|---|
| CN | 107850050 A | 3/2018 |
| CN | 109072872 A | 12/2018 |

(Continued)

OTHER PUBLICATIONS

G. Bir, Multiblade Coordinate Transformation and Its Application to Wind Turbine Analysis, Jan. 7-10, 2008, National Renewable Energy Laboratory, Conference Paper NREL/CP-500-42553 (Year: 2008).*

(Continued)

*Primary Examiner* — Courtney D Heinle
*Assistant Examiner* — Sang K Kim
(74) *Attorney, Agent, or Firm* — Patterson + Sheridan, LLP

(57) ABSTRACT

The present invention relates to a rotor control system for actuating pitch of pitch adjustable rotor blades of a wind turbine in order to reduce edgewise blade vibrations. The system comprises a pitch actuation unit being arranged to receive a torsional vibration signal and apply a filter to the torsional vibration signal to couple the torsional vibration signal to an edgewise vibration of the rotor blades. An m-blade coordinate transformation, such as the Coleman transformation, is applied to the filtered torsional vibrational signal to obtain pitch modification signals.

19 Claims, 3 Drawing Sheets

(56) References Cited

U.S. PATENT DOCUMENTS

| | | | | |
|---|---|---|---|---|
| 2012/0257967 | A1* | 10/2012 | Egedal | F03D 7/0224 |
| | | | | 416/1 |
| 2016/0356266 | A1* | 12/2016 | Koerber | F03D 7/044 |
| 2019/0154001 | A1 | 5/2019 | Ostergaard et al. | |
| 2020/0088165 | A1* | 3/2020 | Nielsen | F03D 7/0224 |
| 2021/0277869 | A1* | 9/2021 | Vasudevan | F03D 7/0296 |

FOREIGN PATENT DOCUMENTS

| | | |
|---|---|---|
| CN | 109563812 A | 4/2019 |
| WO | 2008081232 A1 | 7/2008 |
| WO | 2017092773 A1 | 6/2017 |
| WO | 2017144061 A1 | 8/2017 |
| WO | 2017174094 A1 | 10/2017 |
| WO | 2018210390 A1 | 11/2018 |
| WO | 2020239178 A1 | 12/2020 |

OTHER PUBLICATIONS

PCT, International Search Report and Written Opinon of The International Searching Authority for Application PCT/DK2020/050148 dated Jan. 9, 2020.

Danish Patent and Trademark Office, 1st Techincal Examination including the Search Report and Search Opinion for Application PA 2019 70336, dated Nov. 28, 2019.

Chinese Patent Office, First Office Action for Chinese Patent Application No. 2020800542954, dated Nov. 28, 2023.

European Patent Office, Communication pursuant to Article 94(3) EPC for European Patent Application No. 20729623.7, dated Feb. 23, 2024.

* cited by examiner

REDUCTION OF EDGEWISE VIBRATIONS USING TORSIONAL VIBRATION SIGNAL

FIELD OF THE INVENTION

The present invention relates to control of a wind turbine to reduce structural loading due to vibrations of the blades along the edgewise direction.

BACKGROUND OF THE INVENTION

Wind turbines as known in the art comprises a wind turbine tower supporting a nacelle and a rotor with a number of pitch-adjustable rotor blades.

A wind turbine is prone to vibrations since it comprises a large mass placed at the end of a slender tower. Examples of these vibrations include nacelle movement and blade movement. It is known in the art that certain types of vibrations can be damped by actively pitching of the blades and/or adjusting the generator torque. Edgewise vibrations are generally undesirable as the blades are typically weakly damped in that direction, and there is a higher risk of damaging the blades due to vibrations along the edgewise direction, than along the flapwise direction.

To eliminate harmful vibrations of the blades it is known to shut down the wind turbine for a period of time if potentially damaging edgewise vibrations of the blades are detected. But if these vibrations are detected often, this method will seriously reduce the overall output of the wind turbine. As an alternative active pitching to dampen the edgewise vibrations can be applied.

WO 2018/019345 discloses one example of a solution to mitigate edgewise vibration by use of pitch. Here it is disclosed that based on a motion parameter of the edgewise rotor blade vibration a blade pitch angle control signal is generated so that a resulting force on the rotor blade is opposite and proportional to the edgewise rotor blade vibration velocity.

Nevertheless, there is a need in the art for further ways of mitigating edgewise blade vibrations.

SUMMARY OF THE INVENTION

It would be advantageous to achieve an improved manner of reducing vibrations in a wind turbine. In this regard it would be desirable to provide a control system which can instruct a pitch actuator in a manner that assists in reducing edgewise vibrations of the rotor blades of a wind turbine.

Accordingly, in a first aspect, there is provided a rotor control system for actuating pitch of pitch adjustable rotor blades of a wind turbine comprising a tower and a nacelle, the rotor control system comprises a pitch actuating unit for determining a pitch modification signal to be applied to a pitch actuator for actuating the pitch of the pitch adjustable rotor blades:
  the pitch actuation unit being arranged to:
  receive a torsional vibration signal of the nacelle obtained in a stationary reference frame;
  apply a filter to the torsional vibration signal to couple the torsional vibration signal to an edgewise vibration of the rotor blades thereby providing a filtered torsional vibration signal;
  apply an m-blade coordinate transformation to the filtered torsional vibrational signal to transform the signal to the rotating frame of the rotor blades to obtain the pitch modification signal;
  apply the pitch modification signal to the pitch actuator.

The present invention provides a rotor control system which uses a pitch modification signal for actuating pitch of pitch adjustable rotor blades leading to a reduction in edgewise vibrations of the blades of the turbine. The pitch modification signal is based on an m-blade coordinate transformation based on an input signal reflecting a torsional vibration of the nacelle. In this regard, the torsional vibration may be based on an acceleration measurement of the tower top, of the nacelle itself, of the rotor hub or other relevant signal. The acceleration measurement typically being an angular acceleration signal. The mentioned signals all reflect same movement as these units are mechanically coupled.

An m-blade coordinate transformation transforms a signal between coordinate reference frames. While it is generally known to apply m-blade coordinate transformations in connection with pitch actuation, it is generally done in connection with transforming same quantities between rotating and stationary reference frames. The inventors of the present invention have realized that proper application of m-blade coordinate transformations it is possible to use the pitch system to create a moment (or in-plane force) in response to a torsional vibration signal to obtain an attenuating effect on edgewise vibrations in the blades. And here it should be noted that since the input signals are based on an acceleration signal of nacelle, and not a velocity signal of the blades, the resulting attenuating effect is therefore not to be understood as a damping effect, rather the system creates a disturbance which reduces the vibration of the blade. Moreover, the edgewise vibrations are not directly targeted as edgewise vibrations which are not co-occurring with torsional vibrations are not mitigated. This invention deals with edgewise blade vibrations which are coupled to torsional vibration of the rotor.

In an embodiment, the filtering of the torsional vibration signal includes an inverse gain to the signal. In this manner the coupling of the torsional vibration signal to the edgewise vibration of the rotor blades can be done in a simple and direct manner, where the coupling strength is determined by the gain.

In embodiments, the filtering of the torsional vibration signal may comprises applying a bandpass filter including the backward whirling frequency or the forward whirling frequency or a notch filter to exclude frequency content outside the backward whirling frequency or the forward whirling frequency. In this manner it can be ensured that the coupling of the torsional vibration signal to the torsional vibration signal is done only in the relevant frequency range.

In embodiments, the torsional vibration signal may be further filtered by applying a notch filter to exclude frequency content at a selected frequency range. This frequency range may e.g. be the frequency of the yaw movement. In this manner specific signal components with prominent frequency content which are not related to the edgewise edge vibration can be removed.

The m-blade transformation is also referred to in the art as a multi-blade transformation. In an embodiment the m-blade coordinate transformation is a Coleman transformation, however other transformation may also fall in the category of m-blade coordinate transformations, hereunder so-called d-q transformation and Park transformation or similar transformations. It is within the abilities of the skilled person to determine an alternative transformation which may not strictly be a Coleman transformation, but which operates in an equivalent manner.

In general the m-blade transformation is a transformation between a first coordinate frame and a second coordinate frame, and the m-blade transformation takes a signal from the first frame to the second frame, whereas an inverse m-blade transformation takes the signal from the second frame to the first frame. In this regard signals may be measured, modified and actuated in same or different coordinate frames. In an embodiment the m-blade coordinate transformation takes a signal comprising two components measured in a stationary frame, such as a ground stationary frame and transforms the signals to a three component in a rotating frame. Hereby signal components (the pitch modification signals) are provided which can be imposed onto the three pitch actuators. This embodiment is applicable to a three-bladed wind turbine. For a turbine with a different number of blades, the m-blade transformations need to be adjusted accordingly.

In an embodiment, the m-blade coordinate transformation is taking as input a first signal and a second signal. In such an embodiment, the second signal may be determined by further filtering the filtered signal with a further signal filter with a quadrature phase shift filter phase response.

The inventors of the present invention have realized that by determining the second signal by filtering the first signal with a signal filter with a quadrature phase shift filter phase response, then the pitch actuation signal is altered in a manner where the actuation at one of the two actuating frequencies is reduced or even removed while still obtaining a vibration reducing effect. In this way the actuator's pitching activity can be reduced, and thereby reduce the fatigue exposure on the pitching actuators. The actuator pitching activity may also be tuned in view of specific frequency exiting modes in the turbine, or in a trade-off between pitching activity and resulting vibration attenuating effect of a given turbine structure.

The second signal is determined by filtering the first signal with a signal filter with a quadrature phase shift filter phase response. A quadrature phase shift filter may also be referred to as a 90° phase-shift filter, however it is to be understood, that a 90° phase-shift is not always obtained as the exact phase-shift may depend on the conditions under which the filter is applied. However, in ideal situations a quadrature phase shift filter shifts the filtered signal by 90°. In general the quadrature phase shift filter may be understood as a filter with an ideal phase shift of 90°, but which under working conditions, may obtain a phase shift which is not exactly 90°, but can be approximately 90°, such as 90°±15°.

In an embodiment the signal filter is a leaky integrator. In general other types of filters with a quadrature phase shift may also be used, examples include a general first order low pass filter and a differential filter.

In a further aspect, the invention relates to a wind turbine comprising the rotor control system according the first aspect. In yet further aspects, the invention relates to a method of actuating pitch of pitch adjustable rotor blades of a wind turbine and to a computer program product. The computer program product may be provided on a computer readable storage medium or being downloadable from a communication network. The computer program product comprises instructions to cause a data processing system, e.g. in the form of a controller, to carry out the instruction when loaded onto a data processing system.

In general, the rotor control system may be implemented on a unit or collection of functional units which comprises one or more processors, input/output interface(s) and a memory capable of storing instructions can be executed by a processor.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1A:
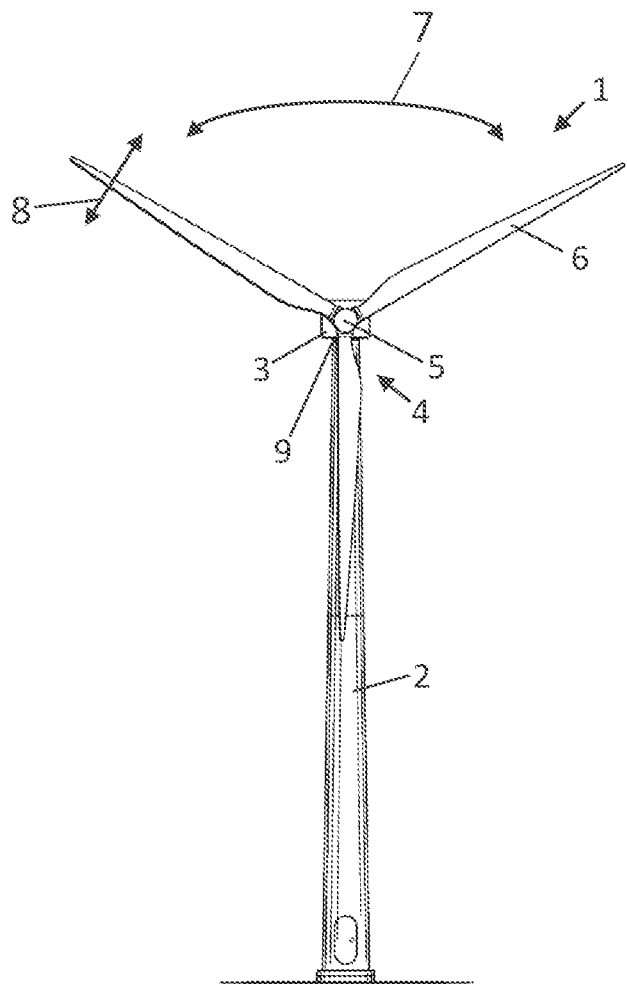
FIG. 1 illustrates, in schematic views, examples of a wind turbine.

FIG. 1A illustrates, in a schematic view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside (or externally to) the turbine and communicatively connected. The rotor blades are pitch-adjustable. The rotor blades can be adjusted in accordance with a collective pitch setting, where each of the blades are set to the same pitch value. In addition to that, the rotor blades are adjustable in accordance with individual pitch settings, where each blade may be provided with an individual pitch setpoint.

Each rotor blade of the turbine may vibrate in the edgewise direction 8, that is vibrations or oscillations along the chord between the trailing edge and the leading edge of the blade. In general when referring to 'an edgewise rotor blade vibration' such reference is made to the first edgewise bending mode, however the disclosure made herein is also relevant to higher order edgewise bending mode with the appropriate adaptations. An edgewise vibration may be measured and/or detected in different manners. In embodiments of the present invention, the edgewise vibration is not as such measured, instead only insofar it is co-occurring with torsional vibration is the edgewise vibration reduced through a coupling between edgewise blade vibrations and torsional vibration.

Figure 1B:
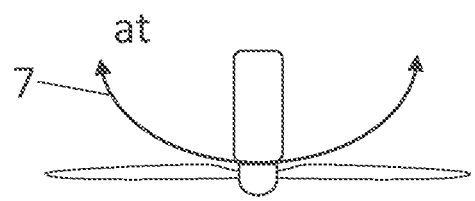

FIG. 1B illustrates torsional vibration along the torsional direction 7. In this regard torsional direction should be understood as movement along a path defined by an arc sector or circle sector as shown. When the tower top vibrates in the torsional direction 7, the acceleration, at, characteristic of the nacelle movement in the torsional direction, varies between two maxima defined by the maximum tower twist during the vibration. In an embodiment using an accelerometer 9 or gyroscope 9 to determine the nacelle movement, the accelerometer/gyroscope should be properly placed, such as in the tower top, or at one end of the nacelle. In this regard, it may not be necessary to directly detecting the movement along the torsional direction, instead also indirect detection of the movement may be used, as long as the indirect movement correlates with the torsional movement. This may e.g. be obtained by an accelerometer which detects movement in the lateral direction, in combination with further information to determine that the movement is related to torsional vibration. Such further information may be the frequency of the vibration.

Figure 2:
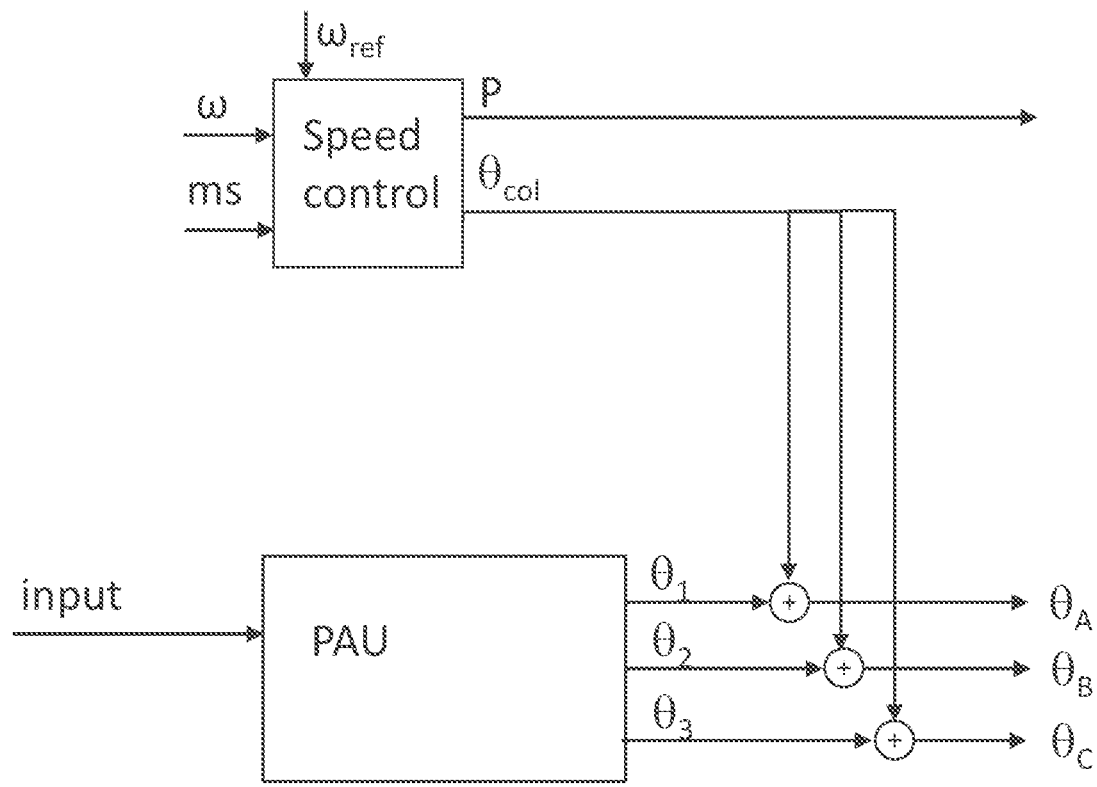
FIG. 2 is a diagram schematically illustrating an embodiment of a feedback speed controller.

FIG. 2 is a diagram schematically illustrating an embodiment of a feedback speed controller implemented to determine individual pitch actuation signals capable of reducing edgewise vibrations in accordance with embodiments of the present invention. In the illustrated implementation, the speed controller minimizes a speed error ($\omega-\omega_{ref}$) between the actual rotor speed, $\omega$, and a reference rotor speed, $\omega_{ref}$, in order to output a requested power P (in the form of a power setpoint) and a collective pitch reference. $\theta_{col}$. The collective pitch reference as determined by the speed controller, in view of the rotor speed, may also take further sensor values into account, this is referred to in FIG. 2 as a measurement set, ms, being input into the speed controller. The feedback speed controller may be implemented by a PI. PID or similar control schemes. In an embodiment, the speed controller may alternatively be a model predictive controller which based on minimizing a cost function is arranged to determine the collective pitch reference and/or the power reference.

FIG. 2 further illustrates a vibration reducing control block referred to as pitch actuation units (PAU). In the pitch actuation unit pitch modification signals ($\theta_1$, $\theta_2$, $\theta_3$) are being determined based on input signal(s) in the form of torsional vibration signals. An embodiment of the implementation of the pitch actuation unit (PAU) is illustrated in FIG. 3.

The PAU control unit determines pitch modification signals for each rotor blade which are superimposed onto the collective pitch reference to provide resulting pitch modification signals ($\theta_A$, $\theta_B$, $\theta_C$) that can be applied to the pitch actuators of the rotor blades individually, and thereby reducing edgewise blade vibrations.

In the embodiment shown in FIG. 2, a collective pitch reference for the pitch-adjustable rotor blades is being determined based on a rotor speed and a resulting pitch modification signal is being applied to the pitch-adjustable rotor blades. The resulting pitch modification signal being applied to the pitch-adjustable rotor blades individually, and for each individual blade being based on a combined signal of the collective pitch reference and the individual pitch modification signals. In an embodiment, the individual pitch modification signal is being applied in a cyclic manner.

Figure 3:
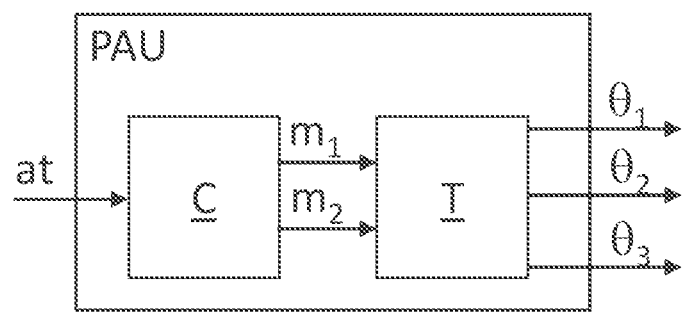
FIG. 3 schematically illustrates an embodiment of a pitch actuation unit with a Coleman transformation computing block.

FIG. 3 schematically illustrates an embodiment of a pitch actuation unit (PAU) which based on an m-blade coordinate transformation (T) in the form of a Coleman transformation determines pitch modification signals which when applied by the pitch actuator generates pitch actuation signals that will reduce edgewise blade vibrations.

The pitch actuation unit PAU is arranged to receive a torsional vibration signal (at) of the nacelle, e.g. the vibrational amplitude in the torsional direction. As will be explained in connection with FIG. 4, the signal is split into two components. In the controller block C, a filter is applied to the torsional vibration signal to couple the torsional vibration signal to the edgewise vibration of the rotor blades.

In an embodiment, the filtering of the torsional vibration signal includes an inverse gain to the signal as well as a bandpass filter including the backward whirling frequency (f−1P) or the forward whirling frequency (f+1P) or a notch filter to exclude frequency content outside the backward whirling frequency or the forward whirling frequency. The frequency of the edgewise vibration being f, and 1P being the frequency of the rotor. Additionally further filtering may be applied in order to improve the signal for digital signal treatment.

The torsional vibration signals are coordinate transformed by an m-blade coordinate transformation in the form of a Coleman transformation T. The Coleman transformation takes the two components of the vibrational signal into the rotating reference frame of the rotor to provide pitch modification signals. In general, the pitch modification signals may be applied to the pitch actuator.

In general, a backward whirling edge frequency is to be understood as an edgewise frequency of a given order, f, subtracted with the rotor frequency. Typically the edgewise frequency is the first order edgewise frequency and the rotor frequency is 1P. However other orders may be relevant in certain situations. A forward whirling frequency is a corresponding frequency but where the edgewise frequency of a given order, f, is added with the rotor frequency 1P.

Advantageously the filtering of the selected signal further comprises applying an inverse gain to the selected signal. That is the signal being multiplied with a negative value. By applying an inverse gain, it may be ensured that the filtered signal is in opposite phase with the selected signal. Thereby it may be ensured that the applied moment by the pitching is applied to dampen the edge vibration.

Figure 4:
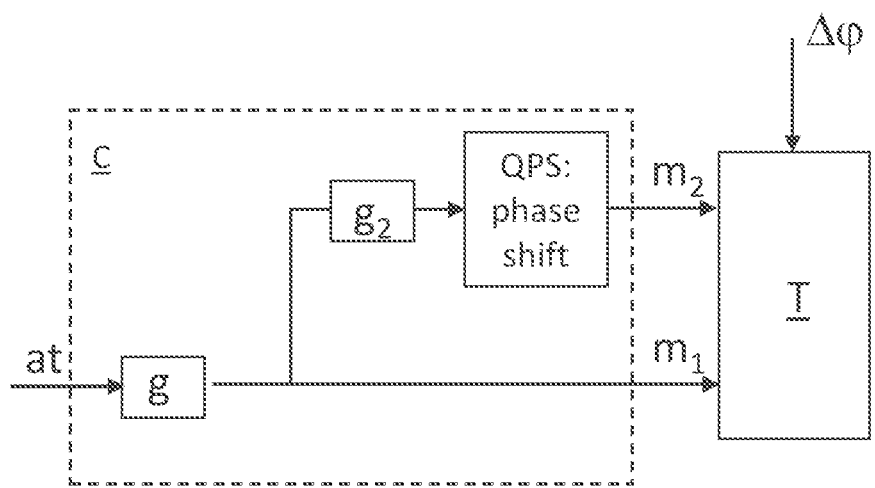
FIG. 4 illustrates an embodiment of the computing block C.

The m-blade coordinate transformation may take as input a first signal $m_1$ and a second signal $m_2$. The second signal may in a general embodiment be set to be zero. However in embodiments the second signal may be determined by further filtering the filtered signal with a further signal filter with a quadrature phase shift filter phase response (QPS). This is illustrated in FIG. 4.

A quadrature phase shift filter shifts the phase with 90°, and the second signal is thus determined as the first signal with a 90 degrees phase shift.

In an embodiment, the 90 degrees phase shift is obtained by applying a filter in the form of a leaky integrator to the first signal. The leaky integrators can be implemented as 1st order low pass filters tuned with a break frequency below the rotor frequency.

By determining the second signal as the first signal with a 90 degrees phase shift, the pitch modification signal is obtained as:

$$\theta_k = A\sin\left((\omega t \mp \Omega t) + \phi \pm \frac{2\pi}{3}(k-1)\right)$$

where the sign (±) depend upon whether or not the second signal is shifted +90° or −90°.

Thus, the signal filter (QPS) may be implemented for selecting either a positive filter phase response or a negative filter phase response.

An advantage of applying the filter with a quadrature phase shift filter phase response (QPS) to obtain the second signal is that the aspect of splitting the frequency content by the Coleman transform in the pitch actuation signal can be avoided (or at least reduced). The frequency content being split into a low frequency component and a high frequency component centred around the input frequency. Thereby if the quadrature phase shift filter is not applied, the resulting pitch modification signals will include frequency content at both the high frequency and at the low frequency. That is the pitch modification signals will include frequency content at the edgewise frequency f+1P and f−1P. In an embodiment, where the quadrature phase shift filter is not applied, the reduced frequency content in the actuation signals may still be obtained by use of notch filters applied to each of the pitch modification signals ($\theta_1$, $\theta_2$, $\theta_3$). The notch filter being applied to notch out either the frequency content at f+1P or at f−1P depending on the frequency content that should be removed. Typically the f+1P content should be removed so as to avoid the high frequency pitching in order to reduce the fatigue exposure of the pitch actuators. The notch filter having a predefined bandwidth to ensure a proper frequency interval being notched out.

FIG. 4 further illustrates optional gains to be applied either as a common gain g, or as an individual gain $g_2$.

In an embodiment a common gain g is applied as an adjustment gain with a gain scheduling term, the gain scheduling term being dependent upon an operational point of the wind turbine. The operational point being a point in a multidimensional parameter space spanned by two or more of the parameters generator speed, pitch angle, electrical power, electrical torque, wind speed, as well as further parameters used for controlling the wind turbine. By applying a gain scheduling dependent on the operational point, the activity of the control feature can be tailored to give operational conditions, both to ensure that control system is sufficiently active in relevant operational points, and to ensure that the control system is only applied in a specified operational space and thereby only reducing the activity level of the pitch system in order not to incur unnecessary fatigue.

The rotor control system may further comprise an activation element, the activation element being dependent upon an operational point of the wind turbine. The activation element may be implemented in the gain scheduling as a zero gain when the control system is deactivated. Other implementations of an activation element is also possible. The activation element may also be dependent upon an operational point of the wind turbine. In this manner it can be ensured that controller is active in operational conditions such as turbulence or other conditions where there is a risk of edgewise vibrations building up. The activation element may include a hysterese to ensure that the controller is not flipping on and off in certain conditions. The activation element may also include a timer to ensure that the controller is active for a certain time thereby increasing the likelihood that the vibration is broken.

By applying an individual gain ($g_2$) on the second input $i_2$ the resulting frequency spectrum of the pitch actuation may be tuned to a specific mix of actuation frequencies and the resulting vibrational reduction effect may be tuned in view of a specific turbine structure.

In an embodiment the m-blade coordinate transformation T may include a phase shift $\Delta\varphi$ to adjust the phase of the filtered signal component. By including a phase shift into the transform the actual timing of when the pitch actuation is applied can be adjusted. This may be needed in order to compensate for computational time delays, or system delays, such as delays incurred by the pitch actuator.

Figure 5:
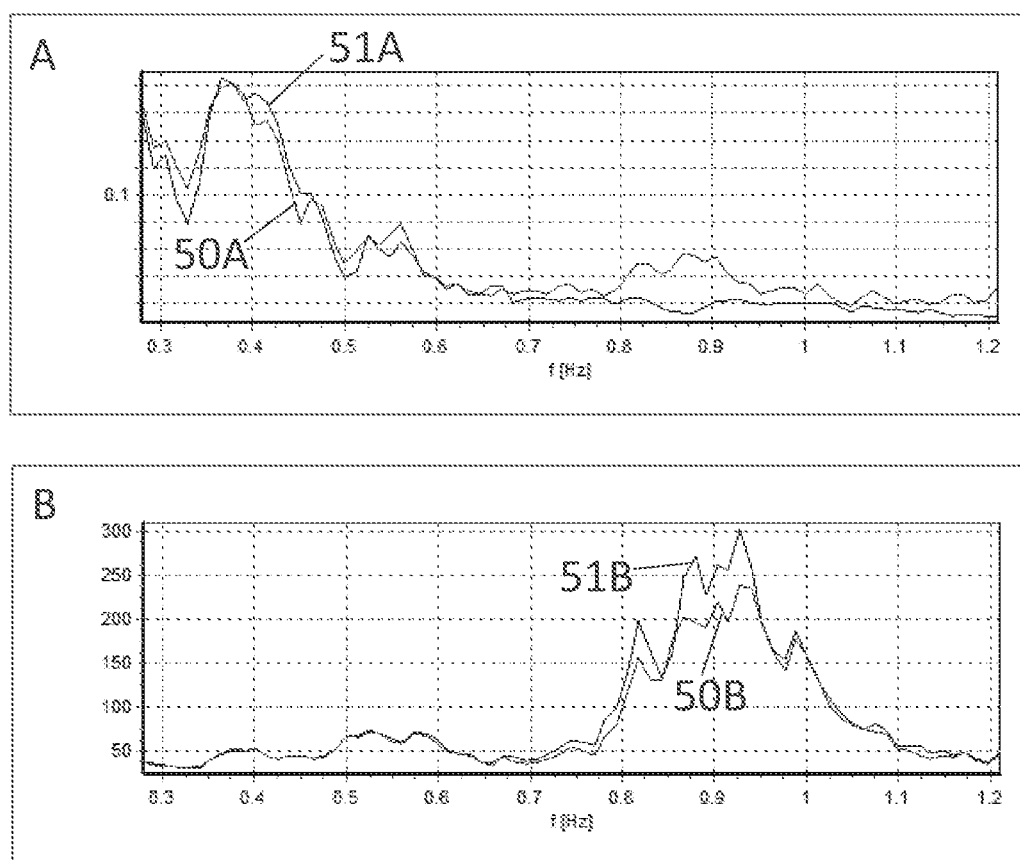
FIG. 5 illustrates simulated signals by applying the embodiment illustrated in FIGS. 3 and 4.

FIG. 5 illustrates the effect of applying the control system according to an embodiment of the present invention.

FIG. 5 illustrates simulated signals by applying the embodiment illustrated in FIGS. 3 and 4 for a wind turbine with a torsional soft tower in a high wind situation. Both plots show FFT plots of pitch signals in 5A and of blade root loads signals in the edgewise direction in 5B of a selected blade. The plots marked 50A and 50B show the pitch activity (50A) and the resulting edgewise load signal (50B) in a situation where the control system is active, and the plots marked 51A and 51B show the pitch activity (51A) and the resulting edgewise load signal (51B) in a situation where the control system is in-active. As can be seen, but a higher pitch activity a low frequencies, the edgewise vibrations (as expressed by the edgewise loads) is significantly reduced.

Example embodiments of the invention have been described for the purposes of illustration only, and not to limit the scope of the invention as defined in the accompanying claims.

The invention claimed is:

1. A rotor control system for actuating pitch of pitch adjustable rotor blades of a wind turbine comprising a tower and a nacelle, the rotor control system comprising:
   a pitch actuating unit for determining a pitch modification signal to be applied to a pitch actuator for actuating the pitch of the pitch adjustable rotor blades; the pitch actuation unit being arranged to:
   receive a torsional vibration signal of the nacelle obtained in a stationary reference frame;
   apply a filter to the torsional vibration signal to couple the torsional vibration signal to an edgewise vibration of the pitch adjustable rotor blades thereby providing a filtered torsional vibration signal;
   apply an m-blade coordinate transformation to the filtered torsional vibrational signal to transform the filtered torsional vibration signal to a rotating frame of the pitch adjustable rotor blades to obtain the pitch modification signal, and wherein the m-blade coordinate transformation takes as an input a first signal and a second signal, and wherein the second signal is determined by further filtering the filtered torsional vibrational with a further signal filter with a quadrature phase shift filter phase response; and
   apply the pitch modification signal to the pitch actuator.

2. The rotor control system according to claim 1 wherein the filtering of the torsional vibration signal includes an inverse gain to the signal.

3. The rotor control system according to claim 1 wherein the filtering of the torsional vibration signal comprises applying a bandpass filter including a backward whirling frequency or a forward whirling frequency or a notch filter to exclude frequency content outside the backward whirling frequency or the forward whirling frequency.

4. The rotor control system according to claim 1 wherein the filtering of the torsional vibration signal comprises applying a notch filter to exclude frequency content at a selected frequency range.

5. The rotor control system according to claim 1 wherein the pitch modification signal is filtered with a notch filter with respect to either an edgewise vibration frequency forward whirling frequency or an edgewise vibration frequency backward whirling frequency.

6. The rotor control system according to claim 1, wherein the further signal filter is a leaky integrator.

7. The rotor control system according to claim 1, wherein the further signal filter is selectable for either a positive filter phase response or a negative filter phase response.

8. The rotor control system according to claim 1, wherein the m-blade coordinate transformation is based on a Coleman transformation.

9. The rotor control system according to claim 1 further comprising:
  determine a collective pitch reference for the pitch adjustable rotor blades, the collective pitch reference being determined based on a rotor speed,
  apply a resulting pitch modification signal to the pitch adjustable rotor blades, the resulting pitch modification signal being applied to the pitch adjustable rotor blades individually, and for each individual blade being based on a combined signal of the collective pitch reference and the individual pitch modification signals.

10. The rotor control system according to claim 1 further comprising an adjustment gain with a gain scheduling term, the gain scheduling term being dependent upon an operational point of the wind turbine.

11. The rotor control system according to claim 1 wherein the m-blade coordinate transformation further includes a phase shift to adjust a phase of the filtered signal component.

12. The rotor control system according to claim 1 further comprising an activation element, the activation element being dependent upon an operational point of the wind turbine.

13. The rotor control system according to claim 1 wherein the torsional vibration signal represents a vibration of the tower along an arcuate path.

14. A wind turbine, comprising:
  a tower;
  a nacelle;
  pitch adjustable rotor blades; and
  a rotor control system for actuating pitch of the pitch adjustable rotor blades, the rotor control system comprising:
    a pitch actuating unit for determining a pitch modification signal to be applied to a pitch actuator for actuating the pitch of the pitch adjustable rotor blades, the pitch actuation unit being arranged to:
      receive a torsional vibration signal of the nacelle obtained in a stationary reference frame;
      apply a filter to the torsional vibration signal to couple the torsional vibration signal to an edgewise vibration of the pitch adjustable rotor blades thereby providing a filtered torsional vibration signal;
      apply an m-blade coordinate transformation to the filtered torsional vibrational signal to transform the filtered torsional vibration signal to a rotating frame of the pitch adjustable rotor blades to obtain the pitch modification signal, and wherein the m-blade coordinate transformation takes as an input a first signal and a second signal, and wherein the second signal is determined by further filtering the filtered torsional vibrational with a further signal filter with a quadrature phase shift filter phase response; and
      apply the pitch modification signal to the pitch actuator.

15. A method of actuating pitch of pitch adjustable rotor blades of a wind turbine, the wind turbine comprising a pitch actuator for actuating the pitch of the pitch adjustable rotor blades, the method comprising:
  receiving a torsional vibration signal of a nacelle of the wind turbine obtained in a stationary reference frame;
  applying a filter to the torsional vibration signal to couple the torsional vibration signal to an edgewise vibration of the pitch adjustable rotor blades thereby providing a filtered torsional vibration signal, wherein in applying the filter to the torsional vibration signal, an adjustment gain is applied with a gain scheduling term, the gain scheduling term being dependent upon an operational point of the wind turbine;
  applying an m-blade coordinate transformation to the filtered torsional vibrational signal to transform the filtered torsional vibration signal to a rotating frame of the pitch adjustable rotor blades to obtain the pitch modification signal; and
  applying the pitch modification signal to the pitch actuator.

16. The method according to claim 15, wherein the filtering of the torsional vibration signal includes an inverse gain to the signal.

17. The method according to claim 15, wherein the filtering of the torsional vibration signal comprises applying a bandpass filter including a backward whirling frequency or a forward whirling frequency or a notch filter to exclude frequency content outside the backward whirling frequency or the forward whirling frequency.

18. The method according to claim 15, wherein the filtering of the torsional vibration signal comprises applying a notch filter to exclude frequency content at a selected frequency range.

19. A non-transitory computer readable storage medium comprising software code adapted to perform an operation of actuating pitch of pitch adjustable rotor blades of a wind turbine when executed on a data processing system, the wind turbine comprising a pitch actuator for actuating the pitch of the pitch adjustable rotor blades, the operation comprising:
  receiving a torsional vibration signal of a nacelle of the wind turbine obtained in a stationary reference frame;
  applying a filter to the torsional vibration signal to couple the torsional vibration signal to an edgewise vibration of the pitch adjustable rotor blades thereby providing a filtered torsional vibration signal, wherein in applying the filter to the torsional vibration signal, an adjustment gain is applied with a gain scheduling term, the gain scheduling term being dependent upon an operational point of the wind turbine;
  applying an m-blade coordinate transformation to the filtered torsional vibrational signal to transform the filtered torsional vibration signal to a rotating frame of the pitch adjustable rotor blades to obtain the pitch modification signal; and
  applying the pitch modification signal to the pitch actuator.

* * * * *